United States Patent Office 3,079,545
Patented Feb. 26, 1963

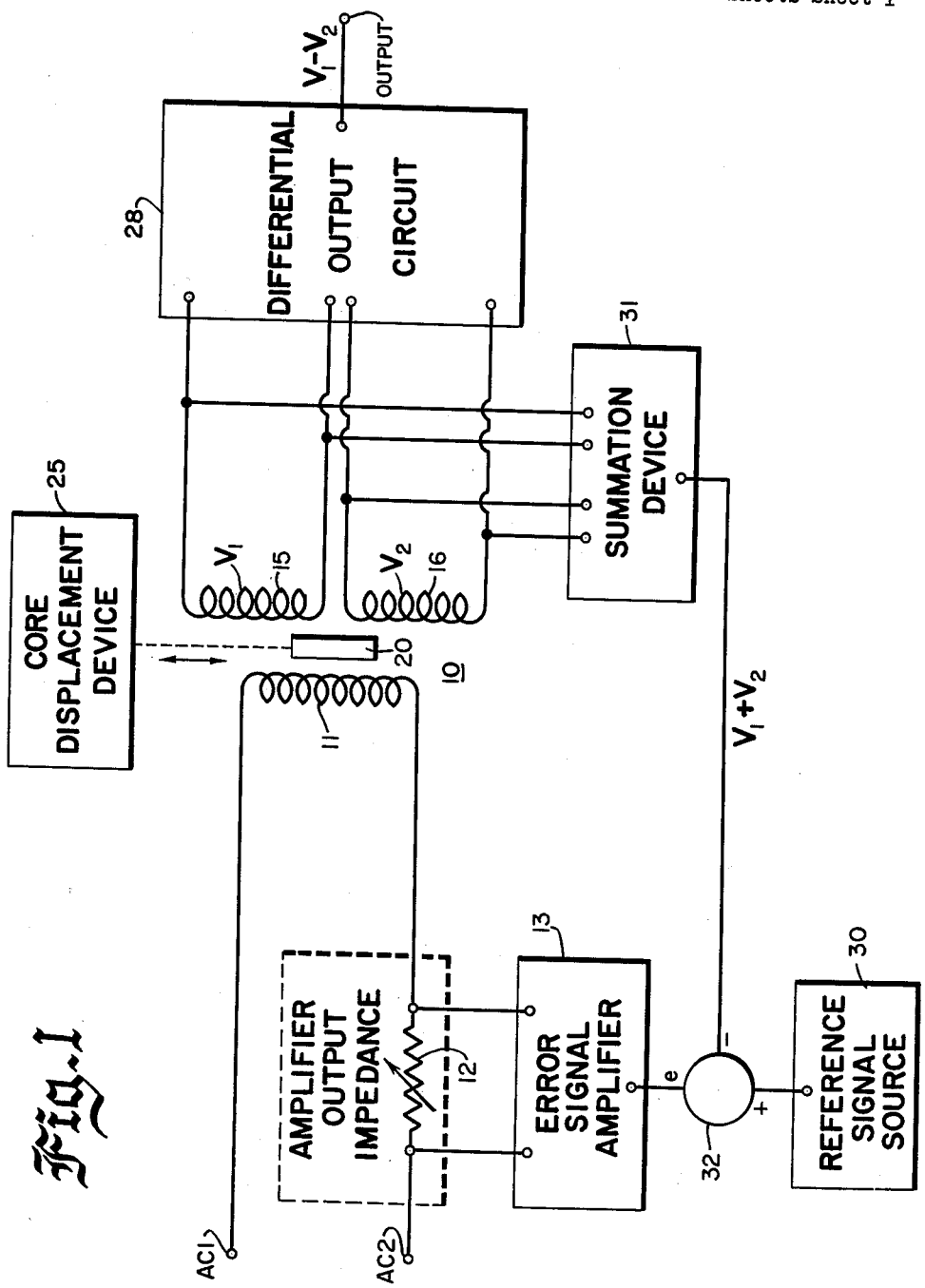

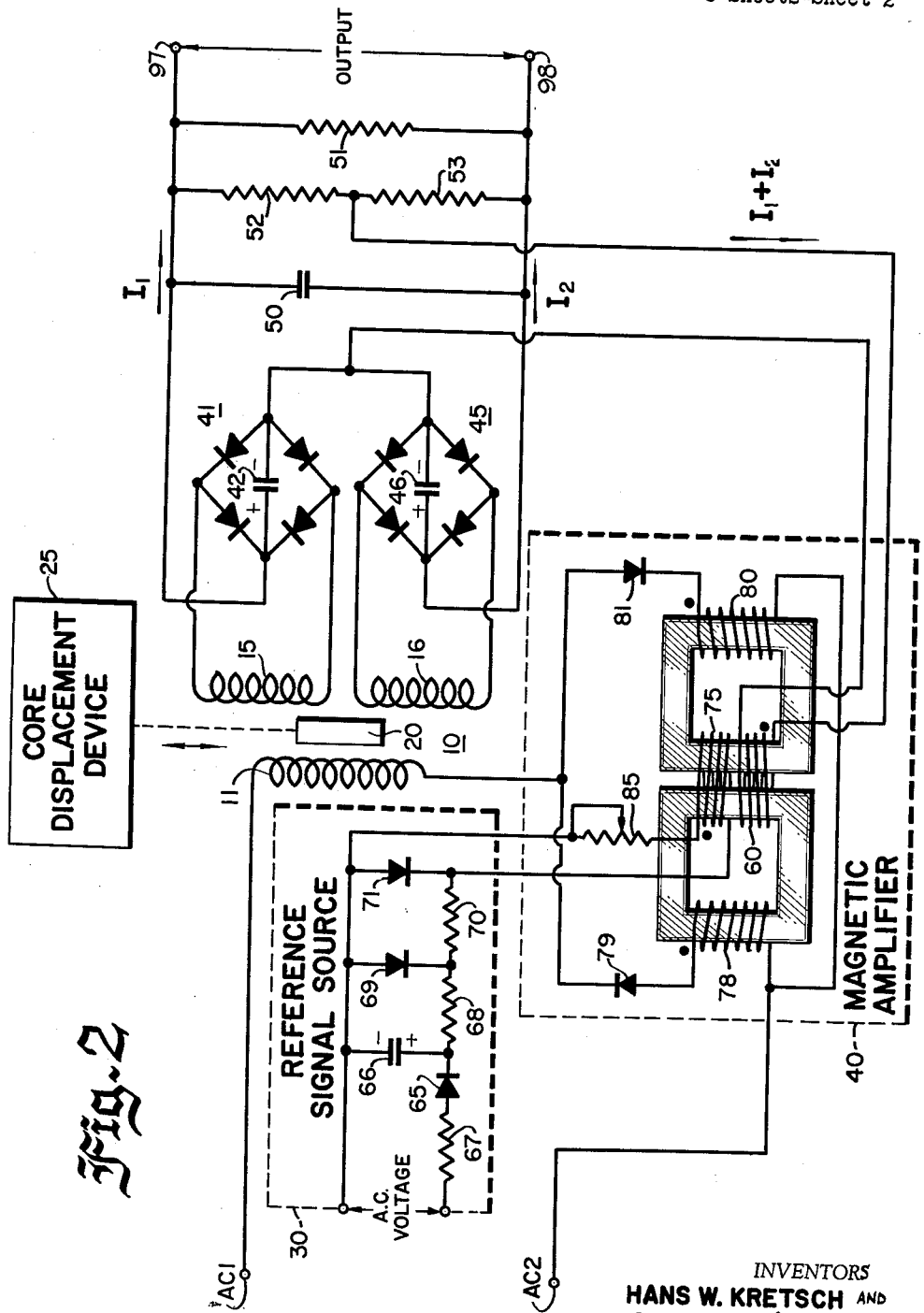

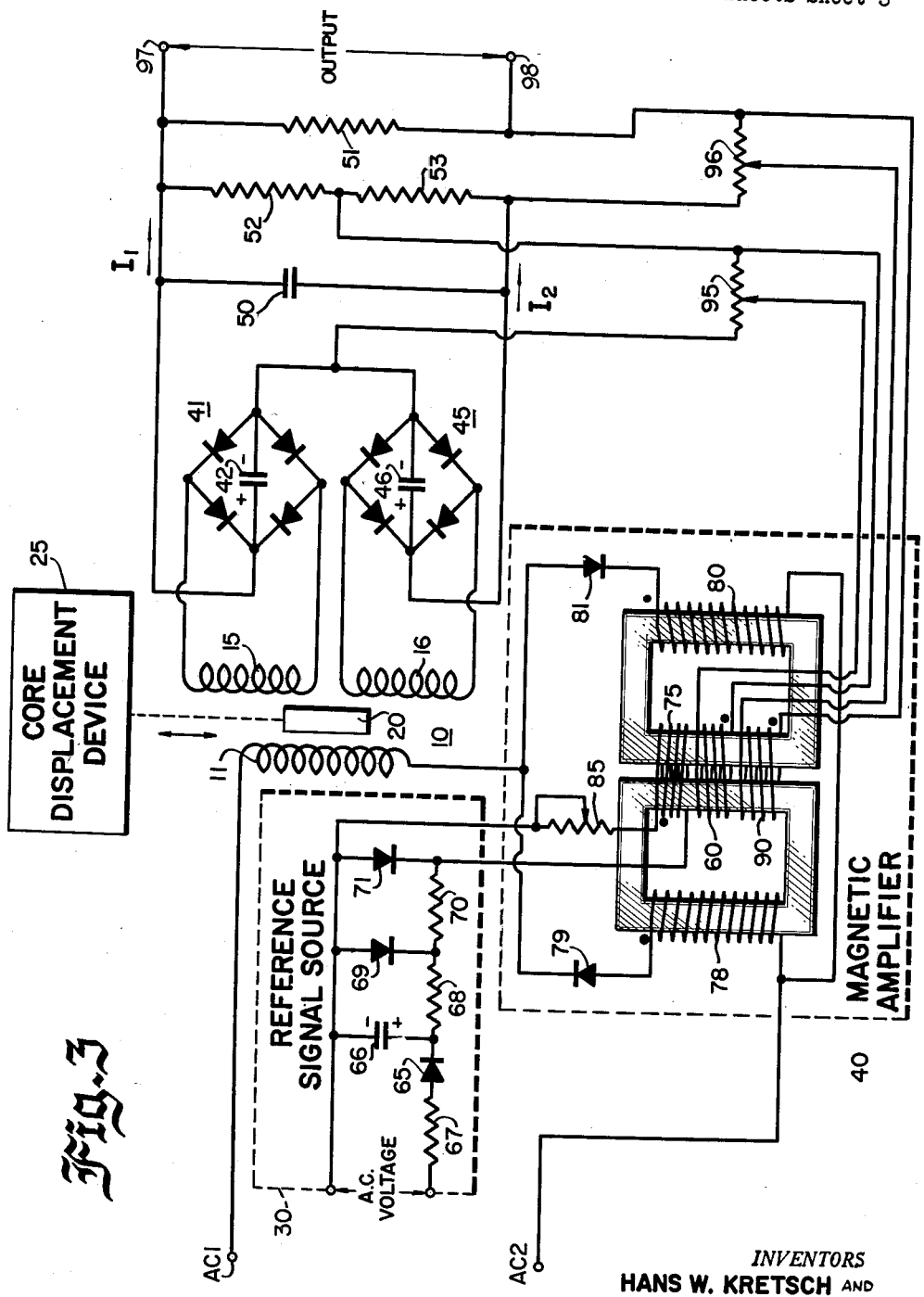

3,079,545
DIFFERENTIAL TRANSFORMER REGULATION SYSTEM
Hans W. Kretsch, Newtown, and George A. O'Sullivan, Danbury, Conn., assignors to Consolidated Controls Corp., Bethel, Conn., a corporation of New York
Filed Dec. 9, 1958, Ser. No. 779,108
17 Claims. (Cl. 323—48)

The present invention relates to differential transformers, and, more particularly, to a regulation system for differential transformers whereby the output of the differential transformer is stabilized against changes in line voltage, line frequency, temperature variations, and the like.

Differential transformers of the movable core type are now of general application and may comprise a pair of coaxial secondary coils which are connected in opposition and are symmetrically disposed in axially spaced relation to the opposite ends of a common primary winding. When the primary is energized by a suitable A.C. voltage and the movable core of the transformer is varied in position in accordance with the variable to be measured, the output of the secondaries varies from an A.C. voltage of one phase, through a null output, to a voltage of the opposite phase, the null point being obtained when the core is symmetrically positioned with respect to the primary and secondary windings. In the alternative a so-called E core type of differential transformer device may be used in situations where a relatively long motion is to be measured. Such differential transformers have been used as transducers of many types of measured variables wherein a linear electrical output signal is obtained proportional to core position. For example, a pressure responsive element, such as a bellows or Bourdon tube, may be employed as a core displacement device and the differential transformer provides a linearly varying output signal proportional to pressure or differential pressure.

While differential transformers have been generally considered to be suitable for their intended purpose, the output signal from these transformers is susceptible to variations in the A.C. voltage which is applied to the primary winding and also to frequency variations of this A.C. voltage. In addition, the differential transformer output signal varies with the ambient temperature of the medium in which the differential transformer is located. One arrangement which has been proposed to compensate for variations in line voltage and temperature is to provide a constant primary current for the primary winding and to provide negative temperature coefficient resistors in the secondary circuits of the differential transformer. Another arrangement for compensating for line voltage and line frequency variations is one in which a second differential transformer is employed the core of which is at a fixed and known position and the primary of which is connected in series with the primary of the transducer differential transformer. The secondaries of the fixed core differential transformer are connected to the secondaries of the transducer differential transformer in such manner that the output signal from the transducer differential transformer is substantially independent of line voltage and line frequency fluctuation. While such compensating arrangements serve to provide some measure of compensation for line voltage and frequency fluctuations and ambient temperature variations, these compensating arrangements are quite complicated and require substantial additional circuitry to obtain the desired compensation. Furthermore, these arrangements do not provide an overall compensation for all possible variations in parameters of the differential transformer but instead attack the compensation from the standpoint of each individual parameter which is to be compensated.

It is, therefore, a primary object of the present invention to provide a new and improved differential transformer regulation system wherein the electrical output signal of the differential transformer is stabilized in a simple and highly efficient manner.

It is another object of the present invention to provide a new and improved differential transformer regulation system wherein the output signal of the differential transformer is stabilized to a high degree of regulation against variations in line frequency, line voltage and ambient temperature.

It is a further object of the present invention to provide a new and improved differential transformer regulation system wherein the electrical output signal of the differential transformer is stabilized against variations in substantially all of the circuit parameters affecting the output signal of the differential transformer.

It is still another object of the present invention to provide a new and improved differential transformer regulation system wherein the sum of the secondary voltages developed in the differential transformer is held substantially constant so as to provide a highly regulated electrical output signal from the differential transformer.

Another object of the present invention resides in the provision of a new and improved differential transformer regulation system wherein a voltage corresponding to the sum of the secondary voltages of the differential transformer is compared to a highly stable reference signal and the A.C. voltage supplied to the primary winding of the differential transformer is varied in accordance with such comparison so as to maintain the electrical output signal of the differential transformer substantially constant despite variations in line voltage, line frequency, ambient temperature and other circuit parameters.

A further object of the present invention resides in the provision of a new and improved differential transformer regulation system wherein the output signal of the differential transformer is a non-linear function of core position and yet the output signal is stabilized against variations in line voltage, line frequency and ambient temperature.

A still further object of the present invention is to provide a new and improved differential transformer regulating system wherein signals corresponding to the sum and difference secondary signals are compared to a reference signal in correct proportion to obtain an output signal which is proportional to the square root of the core position of the differential transformer and yet said output signal is stabilized against variations in line voltage, line frequency and ambient temperature.

Another object of the present invention resides in the provision of a new and improved differential transformer regulating system wherein signals corresponding to the sum and difference secondary signals are compared to a reference signal in correct proportion to obtain an output signal which is inversely proportional to the position of the core of the differential transformer and yet said output signal is stabilized against variations in line voltage, line frequency and ambient temperature.

The invention, both as to its organization and method of operation, together with further objects and advantages thereof, will best be understood by reference to the following specification taken in connection with the accompanying drawings, in which:

FIG. 1 is an electrical block diagram of a differential transformer regulation system embodying the principles of the present invention;

FIG. 2 is an electrical schematic diagram of a typical circuit arrangement of the regulation system shown in FIG. 1; and FIG. 3 is an electrical schematic diagram of an alternative embodiment of the invention whereby a non-linear output signal is produced.

Referring now to the drawings and more particularly to FIG. 1 thereof, the regulation system of the present invention is therein illustrated as comprising a differential transformer indicated generally at 10 which has a primary winding 11 to which an alternating current energizing or exciting voltage is applied from the terminals AC1 and AC2 through a variable impedance indicated schematically at 12 which comprises the output of an error signal amplifier 13 forming a portion of the regulation system itself. The differential transformer 10 also includes a pair of secondary windings 15 and 16 which are coupled to the primary winding 11, primarily through a movable magnetic core 20. The primary winding 11 and the secondary windings 15 and 16 may be coaxially arranged with the primary winding 11 between the secondaries 15 and 16 so as to provide what is generally called a linear variable differential transformer.

The core 20 is arranged to be moved by any suitable core displacement device indicated generally at 25, it being understood that movement of the core 20 may be provided by any suitable device the motion of which is to be measured, indicated or controlled. For example, the core 20 may be mechanically connected to a bellows-spring or Bourdon tube arrangement so that movement of the core 20 is proportional to a pressure which is to be measured. In the alternative, the core 20 may be used with a mass-spring arrangement so as to provide core motion proportional to a force factor. Many other applications will be obvious to those skilled in the art whereby the core 20 is moved in accordance with a measured variable and it will be understood that the above examples are given by way of illustration only.

When the core 20 is in a symmetrical position with respect to the primary and secondary windings the voltage $V_1$ induced in the second winding 15 is substantially equal to the voltage $V_2$ which is induced across the winding 16 and when these secondary voltages are connected to a differential output circuit indicated generally at 28 the difference voltage output is at a minimum or null point. When the core 20 is moved from the null position toward the coil 15 the voltage $V_1$ increases while at the same time the voltage $V_2$ decreases. On the other hand, if the core 20 is moved toward the coil 16 the voltage $V_2$ increases and the voltage $V_1$ decreases. The difference voltage output $V_1-V_2$ from the output circuit 28 thus has a straight line characteristic which goes through a null or minimum signal point when the core is in a central position with respect to the windings of the transformer 10. As the core 20 is moved in accordance with variation of the measured variable the transformer 10 thus functions to provide an electrical signal output which is linearly related to core position and hence the measured variable.

While the differential transformer arrangement described thus far is suitable to provide an electrical output signal proportional to core movement it will be noted that this transformer arrangement is susceptible to variations in many of the circuit parameters which variations will cause corresponding undesired variations in the electrical output signal of the transducer. For example, if the voltage impressed upon the primary winding 11 varies, the electrical output signal of the transformer will vary correspondingly. Also, if the frequency of the primary exciting voltage varies, a corresponding variation in the electrical signal output will be experienced. Furthermore, if the loading on the secondary windings 15 and 16 varies the output signal will undergo corresponding variations and the phase angle of the secondary voltage will likewise be affected. In addition, any change in ambient temperature with a corresponding rise in the resistance of the windings 11, 15 and 16 or change in the magnetic characteristics of the core 20 will produce undesired variations in the electrical signal output of the differential transformer.

In considering the operation of the differential transformer 10, it will be noted that whereas the difference voltage $V_1-V_2$ which forms the electrical output signal of the transformer varies in accordance with core position, the sum of the secondary voltages $V_1+V_2$ will theoretically remain constant with changes in core position since as the voltage produced across one secondary winding decreases the voltage across the other secondary winding increases. However, it will also be noted that the sum of the secondary voltages $V_1+V_2$ will vary in accordance with all of the undesired variations in circuit parameters discussed heretofore. In accordance with the present invention, an arrangement is provided whereby the sum of the secondary voltages is held substantially constant despite undesired variations in circuit parameters so that the electrical output signal from the differential transformer is unaffected by line voltage, line frequency, ambient temperature, secondary loading and other deleterious effects. This is achieved by employing a very stable reference signal source indicated generally at 30 which produces a reference signal of the same value as the output of a summation device indicated generally at 31 which latter device produces a signal proportional to the sum of the secondary voltages $V_1+V_2$. The reference signal and summation signal are compared in a differential error detector or comparing device indicated generally at 32 and the resulting error signal is amplified in the amplifier 13 so as to provide a change in the amplifier output impedance 12 which is connected in series with the primary winding 11 to the line voltage impressed upon the input terminals AC1 and AC2. With this arrangement, if the sum of the secondary voltages $V_1+V_2$ varies due, for example, to a change in the voltage impressed upon the terminals AC1 and AC2, an error signal is produced in the comparing device 32 and this error signal is amplified in the amplifier 13 so as to provide a change in the amplifier output impedance 12 connected in series with the primary winding 11. The change in the impedance 12 varies the A.C. voltage applied to the primary winding 11 and is in the correct direction to correct the voltage $V_1+V_2$ so that it is again equal to the voltage from the reference signal source 30. Accordingly, whenever the sum of the secondary voltages $V_1+V_2$ varies, the voltage impressed upon the primary winding 11 is readjusted so that the sum of the secondary voltages remains constant. This is true irrespective of the disturbance in the system which causes the sum of the secondary voltages to change. Thus, the line voltage may vary, the frequency of the line voltage may vary, the ambient temperature may vary or the loading on the secondary windings 15 and 16 may vary and all of these variations are compensated in accordance with the present invention by comparing the feedback signal derived from the secondary windings with a stable reference signal source and employing the resulting error signal to provide regulation. For example, if the ambient temperature rises and the resistance of the secondary windings increases, the feedback signal will decrease relative to the stable reference current so that the voltage supplied to the primary winding 11 is increased until the feedback signal again approaches the reference signal. In this connection, it will be understood that while reference has been made to secondary voltages, the summation device 31 can be employed to provide the sum of the secondary currents and the reference signal source 30 may provide a reference signal of either voltage or current which is of a magnitude equal to the sum of the secondary currents but of opposite polarity which is applied to the comparing device 32. It will also be understood that the error signal amplifier 13 may control any suitable arrangement for varying the energization of the primary winding 11. For example, the amplifier 13 may control a suitable arrangement for varying the frequency of the voltage employed to energize the winding 11 rather than the amplitude of this voltage, as will be readily understood by those skilled in the art.

In FIG. 2 of the drawings there is shown a specific embodiment of the invention wherein a magnetic amplifier indicated generally at 40 is employed to compare a reference signal from the reference signal source 30 and a current proportional to the sum of the secondary currents produced across the secondary windings 15 and 16 of the differential transformer 10. More particularly, in the embodiment of FIG. 2, the voltage produced across the secondary winding 15 is rectified in a bridge type rectifier circuit indicated generally at 41 so as to provide a unidirectional voltage of the polarity shown in the drawing across the bridge output condenser 42. In a similar manner the voltage produced across the secondary winding 16 is rectified in a bridge type rectifier circuit indicated generally at 45 so as to provide a voltage of the polarity shown across the bridge output condenser 46. The voltages produced across the condensers 42 and 46 are connected in series opposition across an output filter condenser 50 and the difference in secondary voltages is produced across an output load resistor 51. The unidirectional output voltage derived from the bridge circuit 41 causes a current $I_1$ to flow in the conductor connected to the upper terminal of the condenser 50 and the unidirectional voltage developed by the bridge circuit 45 causes a current $I_2$ to flow in the conductor connected to the lower terminal of the condenser 50. A pair of resistors 52 and 53 are connected across the condenser 50 and a feedback winding 60 of the magnetic amplifier 40 is connected between the common junction point of the resistors 52 and 53 and the common connection of the bridge circuits 41 and 45 so that a current proportional to $I_1+I_2$ flows through the feedback winding 60.

The reference signal source 30 comprises a first half wave rectifier circuit which includes a rectifier 65, a filter condenser 66 and a current limiting resistor 67 to the series combination of which there is supplied an A.C. voltage so that a half-wave rectified voltage is developed across the condenser 66. The voltage produced across the condenser 66 is then stabilized by means of a first Zener diode regulation stage comprising a resistor 68 and a Zener diode 69 which are connected in series across the condenser 66. As will be readily understood by those skilled in the art, the Zener diode 69 comprises a PN junction of semiconductors which is inversely biased and shows a predictable well defined Zener breakdown voltage in which region the current in the inverse direction rises rapidly with a slight increase in voltage. Accordingly, a high degree of regulation is provided so that a relatively stable voltage is produced across the Zener diode 69. This regulated voltage is then further regulated in a second Zener diode stage which comprises a resistor 70 and a Zener diode 71 which are connected in series across the Zener diode 69. The Zener diode 71 functions to provide further regulation of the reference signal source so that an extremely stable and well regulated voltage is produced across the Zener diode 71. This reference signal is supplied to a reference winding 75 of the magnetic amplifier 40 so that a fixed reference current flows through the winding 75 which remains substantially constant despite changes in the A. C. voltage applied to the input of the reference signal source 30.

In the illustrated embodiment the magnetic amplifier 40 is of the full wave self saturating type described in detail in the text "Magnetic Amplifier Circuits" by Geyger (McGraw-Hill, 1954) and includes the gate windings 78 and 80, a rectifier 79 being connected in series with the gate winding 78 and an oppositely poled rectifier 81 being connected in series with the gate winding 80. The reference winding 75 and the feedback winding 60 are each wound on both of the cores on which the gate windings 78 and 80 are separately wound. Also, the ampere turns established by the reference winding 75 is in the opposite direction from the ampere turns produced by the feedback winding 60 so that the net control ampere turns produced in the cores of the gate windings 78 and 80 is equal to the difference between the reference signal and the feedback signal, it being remembered that the feedback signal is, in the embodiment of FIG. 2, proportional to the sum of the secondary currents produced by the secondaries of the differential transformer 10. A potentiometer 85 connected in series with the reference winding 75 is employed to adjust or vary the magnitude of the reference current to obtain the desired operating level and output signal for a particular application. Preferably, the potentiometer 85 has a zero temperature coefficient of resistivity and is proportioned in relation to the resistance of the winding 75 so as to compensate for changes in the voltage produced across the diode 71 with temperature, as described in detail in the copending application of George A. O'Sullivan, Serial No. 778,990, filed on December 8, 1958, and assigned to the same assignee as the present invention. The control ampere turns thus established in the cores associated with the gate windings 78 and 80 is effective to reset the flux in each core during alternate control half cycles, it being understood that the rectifiers 79 and 81 are rendered non-conductive during alternate control half cycles to permit resetting of the flux in the respective cores, as will be readily understood by those skilled in the art. However, the rectifiers 79 and 81 conduct on alternate output half cycles, the firing point of the output half cycle, and hence the average value of the output current flowing during each output half cycle being controlled by the level of flux in the respective cores. Accordingly, the average value of the alternating current supplied to the primary winding 11 is varied in accordance with the difference between the reference signal current flowing in the winding 75 and the feedback current flowing in the winding 60, the amplifier 40 having a relatively large gain so that a very small error signal produces a change in the reset flux level in the cores and hence the value of the alternating current supplied to the primary 11. This change in the current supplied to the winding 11 is in the correct direction to bring the feedback current, which is proportional to the sum of the secondary currents $I_1+I_2$, back to its original value with the result that the output signal from the differential transformer 10 is highly stabilized against variations in line voltage, line frequency, ambient temperature and other circuit parameters. In this connection it will be understood that the reference and feedback signals may be compared by means of a single coil on the amplifier 40, instead of the separate coils 75 and 60, by employing a suitable resistance mixing arrangement to the common coil as will be readily understood by those skilled in the art.

While the reference signal source 30 has been described thus far as being a highly stabilized and well regulated source which does not vary with any of the parameters affecting the differential transformer, in certain applications this reference source may be permitted to vary to provide further compensation or correction for the differential transformer. For example, in situations where pressure is being measured by means of a bellows and spring arrangement the modulus of the spring may vary with temperature such that displacement of the core of the differential transformer is not independent of temperature and hence is not a true function of pressure. However by permitting the reference current flowing through the winding 75 to vary with temperature, which may be achieved by any suitable means such as a temperature sensitive series resistor or by proper proportioning of the potentiometer 85 and resistance of the winding 75, the output signal can be rendered independent of the effects of ambient temperature on the core displacement device 25. In this connection it will be understood that the temperature sensitive resistor or other means for varying the reference current should be located in the same vicinity as the core displacement device 25 so as to be subjected to the same ambient temperature conditions, as will be readily understood by those skilled in the art. Also, it is pointed out that the reference signal for the winding 75 may be derived from a remote source and may, if desired, comprise the output signal from a preceding differential transformer in which case the output signal of the second differential transformer is proportional to the product of the first output signal times the core displacement of the second transformer. In the event this reference signal is derived from a preceding differential transformer system such as shown in FIG. 1, this reference signal is supplied to the series combination of the potentiometer 85 and the winding 75 in place of the reference signal source 30. While the reference signal, either fixed or variable, may be derived from a remote location or a preceding differential transformer, it is, however, necessary that the reference signal be stabilized against undesired line voltage, line frequency and ambient temperature variations since otherwise such variations will appear in the output of the final differential transformer.

While a magnetic amplifier or other type of saturating device, such as the illustrated amplifier 40, is particularly suited to the regulation system of the present invention since it combines the functions of comparing the reference signal with the feedback signal or signals and amplifying the error or difference signal so as to regulate the current supplied to the primary winding 11, it will be understood that any other suitable type of comparing device and amplifier arrangement may equally well be employed insofar as the present invention is concerned. Thus, for example, the reference signal and feedback signal may be compared by means of a differential amplifier embodying electron tubes or transistors and the output of the differential amplifier may be employed to control the energization of the winding 11 by any suitable impedance, voltage or frequency varying means.

In certain instances it is desirable to provide an output signal from the differential transformer which is a non-linear monotonical function of the core position rather than the conventional linear function, the term monotonical being used to denote a mathematical function or characteristic which is not double valued and does not curve back on itself. For example, in situations where a differential pressure transducer is employed and an output signal proportional to flow is desired, the output signal should vary in proportion to the square root of core displacement since the square root of the differential pressure measurement is proportional to flow. In order to provide such a non-linear output signal while achieving the above described advantages of the regulation system of FIGS. 1 and 2 the regulating system of FIG. 3 may be employed. Referring to FIG. 3, the regulating system shown therein is substantially the same as that of FIG. 2 with the exception that in FIG. 3 the feedback signal includes a component which is proportional to the difference of the secondary currents derived from the windings 15 and 16 of the transformer 10 as well as a component which is proportional to the sum of the secondary currents, as in FIG. 2. To this end a second feedback coil 90 is wound around both of the cores of the magnetic amplifier 40 and the coil 90 is connected in series with the output load resistor 51 so that a current proportional to $I_1-I_2$ flows through the coil 90. With this arrangement the voltage supplied to the primary winding 11 varies as a function of the position of the core 20. More particularly, as the difference component $I_1-I_2$ increases the sum component $I_1+I_2$ decreases so that the voltage impressed upon the primary winding 11 decreases as core position increases. The output signal from the differential transformer, which is itself proportional to $I_1-I_2$, is therefore a multiplication of the primary voltage times core position. By making the primary voltage a function of core position a non-linear output signal of the form:

$$I_1-I_2 = \frac{ax}{+bx} \quad (1)$$

is obtained, where $x$ represents the displacement of the core from the neutral or null position and $a$ and $b$ are design constants determined by a particular design application. The constants $a$ and $b$ are determined by the proportions in which the sum and difference components are combined in the magnetic amplifier 40. If desired a potentiometer 95 may be employed to control the current supplied to the feedback winding 60 and a potentiometer 96 may be employed to control current to the winding 90, these potentiometers being adjusted to give the desired proportions of sum and difference currents so as to obtain a particular non-linear function. In the alternative, the number of turns, wire size or other parameters of the windings 60 and 90 may be adjusted to give the desired sum and difference current components. In this connection it will be understood that the reference signal is compared to the sum and difference current components, the equation for regulation, and assuming infinite gain in the amplifier 40, being:

$$I_R = c(I_1+I_2) + d(I_1-I_2) \quad (2)$$

where $I_R$ is the reference current and $c$ and $d$ are design constants which are determined by a particular design application.

In examining Equation 1 it will be seen that where the constant $b$ is zero the equation reduces to the conventional linear function in which the output signal $I_1-I_2$ is proportional to core position. This is the situation when no difference current component is used, i.e., the coil 90 is eliminated and the system behaves as described above in connection with FIG. 2. On the other hand, a square root function can be approximated from the hyperbolic function $I_1-I_2$ of Equation 1 by choosing the best approximation constants $a$ and $b$ in Equation 1 from which the correct constants $c$ and $d$ in Equation 2 can be calculated for the particular design application involved. For example, to obtain an approximate square root function for one particular design application it was found that the constant $a$ in Equation 1 should have a value of 2.45 and the constant $b$ should have a value of 1.5. With these values the square root function was approximated to within a few percent over a normalized range of from zero to 1.0. In connection with Equation 1 it will also be noted that the constant $b$ in this equation can be a negative quantity, as when the polarity of the coil 90 is reversed with respect to the coil 60, in which case the primary voltage to the winding 11 would increase with an increase in core position and the output signal would be a monotonical function with an increasing derivative.

Since Equation 1 is in the form of an hyperbola the regulating system of FIG. 3 may be employed to develop an output signal which is proportional to any monotonical function which can be approximated by an hyperbola. For example, an output signal which is the inverse of core position, i.e., proportional to $1/x$ where $x$ is core position, can be reproduced without any appreciable error over a range from 0.5 to 1.0 since the inverse function is itself an hyperbola. This is accomplished by proper choice of the constants $a$ and $b$ in Equation 1 and by offsetting the axes with respect to the hyperbolic curve in both the $x$ and $y$ directions to obtain a curve of the inverse function over the desired range. The offsetting of the $y$ axis is accomplished by adjusting the core position at which a null is obtained and the $x$ axis is offset by adding a fixed voltage in series with the output signal measuring device to the output terminals 97 and 98 of FIG. 3. In this connection it will be understood that the inverse function cannot be approximated down to zero core position since the inverse of zero core position would be infinity. However, over a range of from 0.5 to 1.0 core position an output signal which is the true inverse of core position can be obtained. It will be noted that with all of the non-linear function arrangements provided by the system of FIG. 3, the non-linear output signal remains stabilized against changes in line voltage, line frequency, ambient temperature and other normally disturbing circuit parameters. This is because the feedback signals, although comprising different combinations of the secondary winding signals, are always compared to a reference signal which does not vary in response to these disturbing circuit parameters.

While there have been illustrated and described what are at present considered to be the preferred embodiments of the present invention, it will be apparent that various changes and modifications thereof will occur to those skilled in the art. It is intended in the appended claims to cover all such changes and modifications as fall within the true spirit and scope of the present invention.

What is claimed as new and is desired to be secured by Letters Patent of the United States is:

1. A differential transformer regulation system comprising a differential transformer having a primary winding coupled to a pair of secondary windings and a core movement of which varies the ratio of the signals produced in said secondary windings, means for deriving an output signal from said secondary windings which varies in accordance with a predetermined function of the position of said core, means for developing a reference signal which is independent of said output signal, means for developing a feedback signal proportional to at least one of the signals developed across said secondary windings, means for comparing said reference signal and said feedback signal and means for varying the energization of said primary winding in accordance with said comparing means.

2. A differential transformer regulation system comprising a differential transformer having a primary winding coupled to a pair of secondary windings and a core movement of which varies the ratio of the signals produced in said secondary windings, means for energizing the primary winding of said differential transformer, means for deriving an output signal from said secondary windings which varies in accordance with a predetermined function of the position of said core, means for developing a reference signal which is independent of said output signal, means for developing a feedback signal proportional to at least one of the signals developed across said secondary windings, means for comparing said reference signal and said feedback signal, and means for controlling said energizing means in accordance with the output of said comparing means.

3. A differential transformer regulation system comprising a differential transformer having a primary winding coupled to a pair of secondary windings and a core movement of which varies the ratio of the signals produced in said secondary windings, means for energizing the primary winding of said differential transformer, means for deriving an output signal from said secondary windings which varies in accordance with a predetermined function of the position of said core, means for developing a reference signal which is independent of said output signal, means for deriving a plurality of feedback signals from said secondary windings, means for comparing said reference signal with said feedback signals, and means for controlling said energizing means in accordance with the output of said comparing means so that said output signal accurately represents said predetermined function despite undesired variations in circuit parameters of said transformer system.

4. A differential transformer regulation system comprising a differential transformer having a primary winding coupled to a pair of secondary windings and a core movement of which varies the ratio of the signals produced in said secondary windings, means for energizing the primary winding of said differential transformer, means for developing a reference signal, means for deriving a first feedback signal proportional to the sum of the signals developed in said secondary windings, means for deriving a second feedback signal proportional to the difference of the signals developed in said secondary windings, means for comparing said reference signal and said first and second feedback signals, and means for controlling said energizing means in accordance with the output of said comparing means.

5. A differential transformer regulation system comprising a differential transformer having a primary winding coupled to a pair of secondary windings and a core, means for impressing an alternating current signal on said primary winding, means for varying the position of said core in accordance with variations in a measured variable, means for deriving an output signal from said secondary windings which varies in accordance with the position of said core, means for developing a stable reference signal, means for deriving a feedback signal from said secondary windings, and means controlled by said reference signal and said feedback signal for varying the alternating current signal impressed upon said primary winding so that the sum of the voltages produced across said secondary windings is held substantially constant.

6. A differential transformed regulation system comprising a differential transformer having a primary winding coupled to a pair of secondary windings and a core, means for impressing an alternating current signal on said primary winding, means for varying the position of said core in accordance with variations in a measured variable, means for deriving an output signal from said secondary windings which varies in accordance with the position of said core, means for developing a stable reference signal, means for developing a feedback signal proportional to the sum of the signals produced in said secondary windings, and means jointly controlled by said reference signal and said feedback signal for varying the alternating current signal impressed upon said primary winding so that the sum of the voltages produced across said secondary windings is held substantially constant.

7. A differential transformer regulation system comprising a differential transformer having a primary winding coupled to a pair of secondary windings and a core movement of which varies the ratio of the signals produced in said secondary windings, means for developing a reference signal which is independent of the output of said differential transformer regulation system, means for developing a feedback signal proportional to at least one of the signals developed across secondary windings, means for varying the position of said core in accordance with variations in a measured variable, means for deriving an output signal from said secondary windings proportional to the difference in signals produced therein, error detecting means for developing an error signal when said feedback signal varies with respect to said reference signal, means for amplifying said error signal, and means controlled by said amplified error signal for controlling the energization of said primary winding.

8. A differential transformer regulation system comprising a differential transformer having a primary winding coupled to a pair of secondary windings and a core movement of which varies the ratio of the signals produced in said secondary windings, means for energizing the primary winding of said differential transformer, means for developing a reference signal which is independent of the output of said differential transformer regulation system, means for developing a feedback signal proportional to at least one of the signals developed across said secondary windings, means for varying the position of said core in accordance with variations in a measured variable, means for deriving an output signal from said secondary windings proportional to the difference in signals produced therein, error detecting means for developing an error signal when said feedback signal varies with respect to said reference signal, means for amplifying said error signal, and means controlled by said amplified error signal for controlling said energizing means in the correct direction to reduce said error signal.

9. A differential transformer regulation system comprising a differential transformer having a primary winding coupled to a pair of secondary windings and a core movement of which varies the ratio of the signals produced in said secondary windings, means for developing a reference signal, means for energizing the primary winding of said transformer, means for varying the position of said core in accordance with variations in a measured variable, means for deriving a plurality of feedback signals from said secondary windings, means jointly controlled by said reference signal and said feedback signals for controlling said energizing means so that said feedback signals are maintained substantially equal to said reference signal, and means for deriving an output signal from said secondary windings which is proportional to the square root of variations in said measured variable.

10. A differential transformer regulation system comprising a differential transformer having a primary winding coupled to a pair of secondary windings and a core movement of which varies the ratio of the signals produced in said secondary windings, means for developing a reference signal, means for energizing the primary winding of said transformer, means for varying the position of said core in accordance with variations in a measured variable, means for deriving a plurality of feedback signals from said secondary windings, means jointly controlled by said reference signal and said feedback signals for controlling said energizing means so that said feedback signals are maintained substantially equal to said reference signal, and means including an auxiliary current source for deriving an output signal from said secondary windings which is inversely proportional to variations in said measured variable.

11. A differential transformer regulation system comprising a differential transformer having a primary winding coupled to a pair of secondary windings and a core, means for energizing the primary winding of said differential transformer, means for varying the relative positions of said core and said secondary windings in accordance with variations in a measured variable, means for deriving an output signal from said secondary windings which is proportional to the difference in voltages produced across said secondary windings and varies in accordance with said relative movement of said core and said secondary windings, and means for maintaining the sum of the voltages produced across said secondary windings substantially constant.

12. A differential transformer regulation system comprising a differential transformer having a primary winding coupled to a pair of secondary windings and a core, means for energizing the primary winding of said differential transformer, means for varying the relative positions of said core and said secondary windings in accordance with variations in a measured variable, means for deriving an output signal from said secondary windings which is proportional to the difference in voltages produced across said secondary windings and varies in accordance with said relative movement of said core and said secondary windings, means for deriving a control signal from said secondary windings which is proportional to the sum of the signals developed in said secondary windings, and means utilizing said control signal for varying the energization of said primary winding so that said control signal is held substantially constant.

13. A differential transformer regulation system comprising a differential transformer having a primary winding coupled to a pair of secondary windings and a core, means for energizing the primary winding of said differential transformer, means for varying the relative positions of said core and said secondary windings in accordance with variations in a measured variable, means for deriving an output signal from said secondary windings which is proportional to the difference between the signals produced in said secondary windings and varies as a function of said relative movement of said core and said secondary windings, means for developing a reference signal which varies in accordance with a predetermined parameter, means for deriving a control signal from said secondary windings which is proportional to the sum of the signals developed in said secondary windings, and means jointly controlled by said reference signal and said control signal for varying the energization of said primary winding.

14. A differential transformer regulation system as set forth in claim 13, wherein said predetermined parameter is ambient temperature in the vicinity of said differential transformer.

15. A differential transformer regulation system comprising a differential transformer having a primary winding coupled to a pair of secondary windings and a core, means for energizing the primary winding of said differential transformer, means for varying the relative positions of said core and said secondary windings in accordance with variations in a measured variable, means for developing a reference signal, means for developing a first control signal proportional to the sum of the signals developed in said secondary windings, means for developing a second control signal proportional to the difference between the signals developed in said secondary windings, means jointly controlled by said reference signal and said first and second control signals for varying the energization of said primary winding, and means for deriving an output signal from said secondary windings which is proportional to the difference between the signals developed in said secondary windings and varies as a non-linear function of said relative movement of said core and said secondary windings.

16. A differential transformer regulation system as set forth in claim 15, wherein said output signal is the inverse function of said relative movement of said core and said secondary windings over a predetermined range of values.

17. A differential transformer regulation system as set forth in claim 15, wherein said output signal varies in proportion to the square root of said relative movement of said core and said secondary windings.

References Cited in the file of this patent

UNITED STATES PATENTS

| | | |
|---|---|---|
| 2,507,344 | MacGeorge | May 9, 1950 |
| 2,622,237 | Hornfeck | Dec. 16, 1952 |
| 2,802,166 | Sanderlin et al. | Aug. 6, 1957 |
| 2,825,864 | Eagan | Mar. 4, 1958 |

UNITED STATES PATENT OFFICE
CERTIFICATE OF CORRECTION

Patent No. 3,079,545

February 26, 1963

Hans W. Kretsch et al.

It is hereby certified that error appears in the above numbered patent requiring correction and that the said Letters Patent should read as corrected below.

Column 7, line 74, for "$I_1-I_2=\frac{ax}{+bx}$" read -- $I_1-I_2=\frac{ax}{1+bx}$ --; column 8, lines 25, 33, 34, 39, 44, 51 and 60, for "1", each occurrence, read -- (1) --; same column 8, line 35, for "2" read -- (2) --.

Signed and sealed this 22nd day of October 1963.

(SEAL)
Attest:

ERNEST W. SWIDER
Attesting Officer

EDWIN L. REYNOLDS
Acting Commissioner of Patents